United States Patent [19]

Wehle et al.

[11] Patent Number: 4,693,005

[45] Date of Patent: Sep. 15, 1987

[54] GUIDE BAR FOR A SAW CHAIN OF A MOTOR-DRIVEN CHAIN SAW

[75] Inventors: Anton Wehle, Fellbach; Dieter Unrath, Plüderhausen; Gunther Zimmermann, Waiblingen, all of Fed. Rep. of Germany

[73] Assignee: Andreas Stihl, Waiblingen, Fed. Rep. of Germany

[21] Appl. No.: 891,628

[22] Filed: Aug. 1, 1986

[30] Foreign Application Priority Data

Aug. 8, 1985 [DE] Fed. Rep. of Germany ....... 3528433

[51] Int. Cl.[4] ...................... B23D 57/02; B23D 59/04; B27B 17/12

[52] U.S. Cl. ...................................................... 30/383

[58] Field of Search ................................. 30/381-387; 83/169

[56] References Cited

FOREIGN PATENT DOCUMENTS 812471 8/1951 Fed. Rep. of Germany ........ 30/383

*Primary Examiner*—Douglas D. Watts

*Attorney, Agent, or Firm*—Walter Ottesen

[57] ABSTRACT

A guide bar for a saw chain of a motor-driven chain saw has a guide groove formed in the periphery thereof. The drive links of the saw chain have projections known as rakers which protrude beyond the side links of the saw chain and which are guided in the guide groove. The guide bar has at least one supply bore in a groove wall through which lubricating oil is supplied for lubricating the saw chain. In the vicinity of the supply bore, a lubricant surface extending approximately parallel to the groove bottom is provided. This lubricant surface extends to at least one supply surface extending as far as the supply bore. The rakers of the drive links move above the lubricant surface with a narrow spacing. The lubricating oil supplied via the supply bore is guided via the supply surface to the lubricant surface where it forms a film into which the rakers extend as the saw chain revolves. This assures that the supplied lubricating oil is picked up by the rakers and carried by them to the link locations of the saw chain thereby assuring very effective lubrication.

18 Claims, 5 Drawing Figures

GUIDE BAR FOR A SAW CHAIN OF A MOTOR-DRIVEN CHAIN SAW

FIELD OF THE INVENTION

The invention relates to a guide bar for a saw chain of a motor-driven chain saw. The guide bar has a guide groove extending around its peripheral edge. The saw chain has driving links, cutting links and connecting links. The saw chain is guided in the guide groove by means of rakers of the driving links that protrude downwardly beyond side-connecting links and into the groove. The guide bar has at least one bore in a groove wall for supplying lubricating oil for the saw chain.

BACKGROUND OF THE INVENTION

In known guide bars of this type, the lubricating oil is introduced into the guide groove via the supply bore and collects on the groove bottom. There it is picked up by the rakers of the driving links, whenever the tips of the rakers come into contact with the lubricating oil as the saw chain revolves around the guide bar. As a result, the lubricating oil is transported upwardly into the vicinity of the rivet connections thereby lubricating the saw chain. A disadvantage here is that some of the lubricating oil on the groove bottom cannot be picked up by the rakers because there is necessarily a gap between the groove bottom and the rakers, in which the lubricating oil remains and thus is unavailable for lubricating purposes.

SUMMARY OF THE INVENTION

It is an object of the invention to provide a guide bar wherein the lubricating oil that is supplied is satisfactorily and substantially completely picked up by the rakers and can be transported to the link connections of the saw chain.

In the guide bar according to the invention, the lubricating oil is guided from the supply bore via the supply surface to the lubricant surface. On this surface, the lubricating oil can form a film into which the rakers extend as the saw chain revolves. This assures that all the lubricating oil that is supplied is substantially completely picked up by the raker directly, as it moves across the lubricant surface in the course of the revolution of the saw chain, and is carried on to the connecting locations of the saw chain. Very effective lubrication of the saw chain is thus assured in a simple manner, so that the saw chain has a long service life. Since the lubricant surface extends approximately parallel to the groove bottom, the lubricating oil remains on the lubricant surface and does not drain off onto the groove bottom.

BRIEF DESCRIPTION OF THE DRAWING

The invention will now be described with reference to the drawing wherein.

DESCRIPTION OF THE PREFERRED EMBODIMENTS OF THE INVENTION

Figure 1:
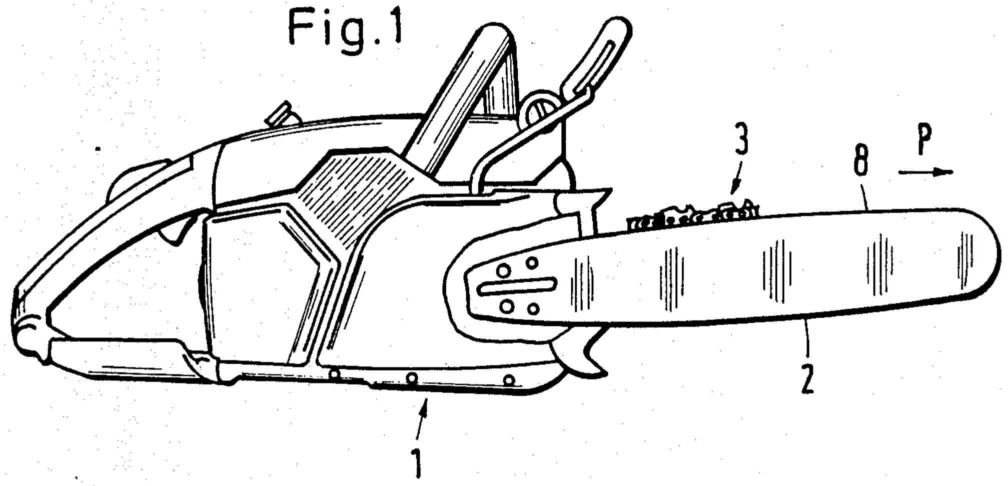
FIG. 1 is a side elevation view of a motor-driven chain saw having a guide bar on which a saw chain, shown only in part, revolves.

The motor-driven chain saw 1 of FIG. 1 has a guide bar 2 on which a saw chain 3 revolves. The saw chain 3 has driving links 4, 4', side cutting links 5, 5'' and side connecting links 6, 6', 6'' which are linked via rivets 7 with the driving and cutting links (FIGS. 2 and 3).

The cutting links 5, 5'' and connecting links 6, 6', 6'' are disposed on both sides of the driving links 4, 4'. The cutting and connecting links are supported on the edge 8 of the guide bar 2, while the driving links extend with a projection downwardly past the cutting and connecting links into a guide groove 10 extending around the guide bar 2. This projection is the so-called raker 9, 9'. The guide groove extends at half the thickness of the guide bar 2 along its edge, such that the edge 8 is defined by the two edge portions 8' and 8'' (FIG. 3) of the respective groove walls 11, 11'.

Figure 2:
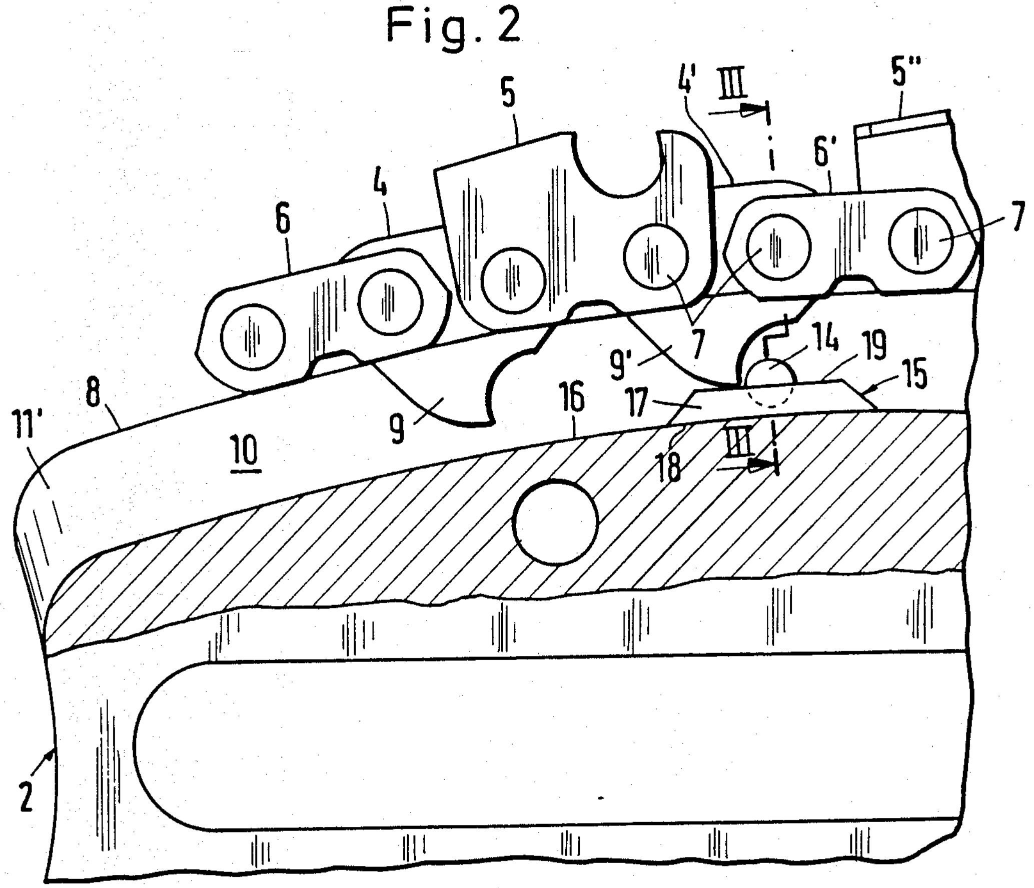
FIG. 2 is an elevation view which is partly in section and shows a portion of the rear end of the guide bar according to the invention having an insert part mounted in the guide groove of the guide bar.
Figure 3:
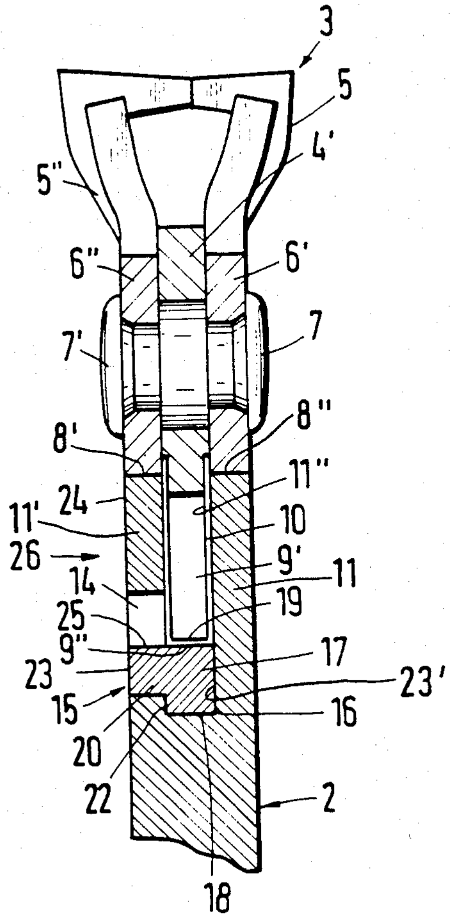
FIG. 3 is a section view taken along the line III—III of FIG. 2 and shows an insert mounted on the guide bar groove.

As FIGS. 2 and 3 show, a supply bore 14 for lubricating oil is provided in one groove wall 11, and the saw chain 3 is lubricated with the lubricating oil as this oil, during the revolution of the saw chain, is picked up and supplied to the saw chain by the rakers 9, 9' and in particular by the tips of the rakers. The supply bore 14 is preferably located in the rear half of the guide bar 2 and in the lower half of the groove wall 11, spaced from and above the groove bottom 16. Any insert part 15 is disposed in the guide groove 10 in the vicinity of the supply bore 14. The insert part rests on the groove bottom 16 and extends upwardly to about half the height of the supply bore 14.

The insert part 15 has a plate-like base 17, which is trapezoidal in side view (FIG. 2), and which is longer by a multiple of the diameter of the supply bore 14, preferably three to four times longer than this diameter. The bore 14 is located at approximately half the length of the insert part 15. Preferably, the length of the insert part 15 is approximately equal to the spacing between adjacent drive links 4, 4' so that when the saw chain 3 is revolving, one raker 9, 9' always slides over the insert part thereby assuring continuous lubrication of the saw chain. The thickness of the base 17 is approximately equal to the clear inside width of the guide groove 10. The insert part 15 rests with its longer longitudinal edge 18 on the groove bottom 16, while the upper, shorter longitudinal edge 19 extends at approximately half the height of the supply bore 14.

The insert part 15 has a base portion 17 and an extension 20 (FIG. 3) which protrudes perpendicularly outward beyond the outer face 22 of the base portion 17. The outer face 22 rests on the inside 21 of the groove wall 11 below the supply bore 14. The extension 20 protrudes in a form-fitting manner into the lower half of the supply bore 14 and rests with its curved surface completely on the peripheral edge of the supply bore, as a result of which the insert part is positionally secured both in the direction of revolution P of the saw chain 3 and at right angles thereto. The end face 23 of the extension 20 preferably is located in the outer face 24 of the groove wall 11, so that a smooth, plane outer face is provided in which oil or dirt cannot be caught.

The extension 20 has an approximately semicircular cross section, and its flat top 25 is flush with the shorter longitudinal edge 19 of the base portion 17, which extends approximately parallel to the groove bottom 16. The insert part 15 rests with its end face 23' on the inner wall 11" of the groove wall 11'. The surfaces 25 and 19 of the insert part 15 from a plane sliding face, over which the lubricating oil, supplied from outside in the direction of the arrow 26 (FIG. 3) through the supply bore 14, reaches the inside of the groove 10 by the shortest route and can be picked up on this sliding surface 19 by the rakers 9, 9', the tips of which pass with only slight play above the insert part 15. The straight sliding surface 19 has the advantage that the oil forms a film on the plane surface and remains there, rather than flowing downward onto the groove bottom 16, where it can no longer be picked up by the rakers.

The insert part 15 is preferably formed as a molded plastic part, which is injected into the groove 10 and supply bore 14. However, it may also be a preformed plastic or metal part made of softer material than the guide bar 2. In this case, it is placed in a form and surrounded by the guide bar when the guide bar is being produced.

Figure 4:
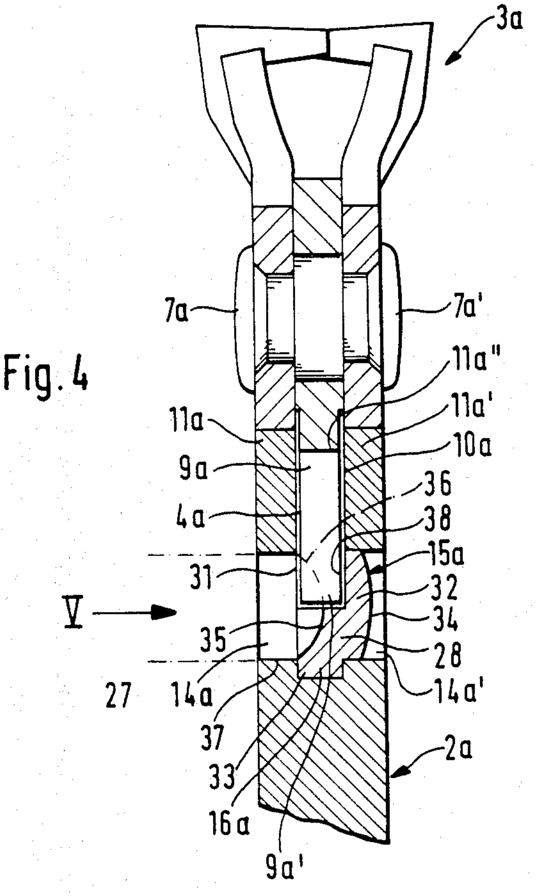
FIG. 4 shows a second embodiment of a guide bar according to the invention wherein the view corresponds to that of FIG. 3; and, FIG. 5 shows a portion of the guide bar of FIG. 4 viewed in the direction of the arrow V of FIG. 4.
Figure 5:
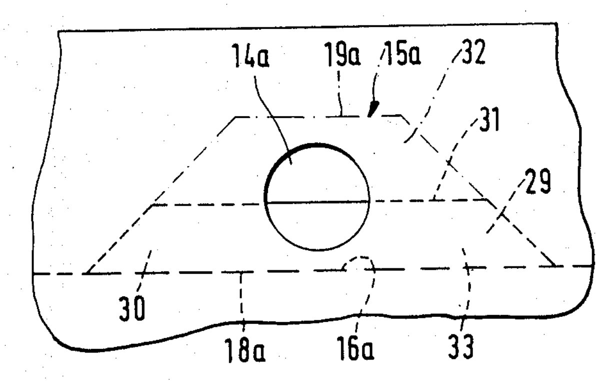

The embodiment of FIGS. 4 and 5 differs from the above-described embodiment in that the guide bar **2*a* has two bores 14*a* and 14*a'*, preferably of equal size, which are preferably located at the same height, and of which the bore 14*a* serves to supply the lubricating oil. As in the embodiment of FIGS. 1 to 3, the bores are spaced slightly above the groove bottom 16*a***.

The embodiment of FIGS. 4 and 5 also differs from the above-described embodiment because the insert part **15*a* is configured differently in that it is retained in the groove 10*a* and in the bore 14*a'* as a press-fit by being pressed into position. The insert part 15*a* closes off bore 14*a'* to prevent the lubricating oil from draining out of the guide groove 10*a***.

As compared with the guide bar 2 of FIGS. 1 to 3, the guide bar **2*a*** affords the advantage that during the assembly of the guide bar, special care need not be taken to provide a special assembly position in the motor-driven chain saw. A further advantage is that the two bores are simple and quick to make, while if only a single supply bore is provided, drilling must be done using a bit stop to prevent drilling through the opposite groove wall.

In its unpressed state, the insert part **15*a*, like the insert part 15, has a trapezoidal outline in side elevation as shown in FIG. 5, resting with its longer longitudinal edge 18*a* on the groove bottom 16*a*. However, in its unpressed state the insert part 15*a* is approximately twice as high as the insert part 15, so that a shorter longitudinal edge 19*a* is spaced by approximately the same distance above the bores 14*a*, 14*a'* as the longer longitudinal edge 18*a* is spaced below the bores (see the dash-dotted lines in FIG. 5**).

After the insert part **15*a* is inserted and pressed into the groove bottom 16*a* and the bore 14*a*, the insert part has the shape shown in FIG. 4. It then has a straight step 31 approximately halfway up, which extends approximately parallel to the groove bottom 16*a*. The upper portion 32 of the insert part 15*a*, which is located insed the bore 14*a'*, is of narrower configuration when compared to the lower portion located below the step 31. Preferably, the upper portion 32 is only approximately half as thick as the lower portion 33, which has approximately the same shape as the base 17 of the insert part 15 of FIGS. 2 and 3. The step 31 is shorter by one-third than the length of the longer longitudinal edge 18 or 18*a*, while the shorter longitudinal edge 19*a* of the insert part, in the unpressed or undeformed state, is only approximately half as long as the step 31. The step 31 is located at approximately half the elevation of the bores 14*a*, 14*a'* and forms a sliding surface onto which the lubricating oil is fed and from which the lubricating oil is picked up by the rakers 9*a* of the drive links 4*a*. In the vicinity of the step 31, the groove bottom 16*a* is elevated by means of the insert part 15*a*, as in the first embodiment described, which assures that the lubricating oil will be picked up in a satisfactory manner by the rakers 9*a'*, or by their respective tips, and thus assures satisfactory lubrication of the saw chain 3*a* with its rivet connections 7*a*, 7*a'***.

In its assembled and pressed position, the insert part **15*a* protrudes with a middle portion 38 into the bore 14*a'*, which is closed by this portion 38. As a result, the lubricating oil supplied via the supply bore 14*a* into the guide groove 10*a* of the guide bar 2*a* cannot unintentionally escape from the guide groove. The outer side 34 of the portion 28, which is located at approximately half the width of the bore 14*a'*, is curved outward in a slightly convex manner. The other outer side of the insert part 15*a* has, in the vicinity of the bores 14*a*, 14*a'* below the step 31, an outer side 35 which is curved outward in a concave manner in the direction toward bore 14*a'*, preferably with approximately the same radius of curvature as the outer side 34. The radii of curvature of the outer side 34 and of the outer side 35 correspond to the radius of curvature of a spherical end face 36 of a plunger 27 shown in phantom outline in FIG. 4 with which the insert part 15*a* is pressed into the bore 14*a***.

The outer side 35 extends from the lower edge 37 of the supply bore **14*a* as far as the step 31. The outer side 35 has the advantage that the lubricating oil supplied via the supply bore 14*a*, because of the concave configuration, is moved quickly upward to the step 31** thereby assuring a substantial improvement in saw chain lubrication.

The insert part **15*a* is made of soft material, preferably aluminum. Because of the substantially softer material as compared with the guide bar 2*a*, the insert part can easily be pressed into the guide groove 10*a* and the bore 14*a'*. It also has the advantage that the drive links are not damaged when the saw chain wears. This is because they slide on the insert part 15*a* and in particular on its step 31**, and since the insert part is made of relatively soft material the step can receive abrasion tracks or the like.

During assembly, the insert part **15*a*, which has the shape shown in dash-dotted lines in FIG. 5, is first inserted into the guide groove 10*a* from above, until it rests with its longer, lower longitudinal edge 18*a* on the bottom 16*a*. The plunger 27 is then driven into the supply bore 14*a*, whereupon the insert part 15*a* is pressed outward into the bore 14*a'* in its middle section located in the vicinity of the bore. In this process, its middle portion 28 having the outer face 34 curved convexly outward is formed. Next, via the guide groove 10*a*, a further plunger (not shown) is driven in from above, pressing the insert part firmly against the groove bottom 16*a*. The plunger has a shape such that in this process the smooth, plane step 31 and an adjoining inner wall 38 of the portion 28 are formed, the adjoining inner wall 38 being flush with the inner wall surface 11*a"***.

The guide bars 2, 2a may, however, also be made of three interconnected plates, preferably of equal thickness. The insert parts 15 and 15a are also suitable for guide bars of this kind.

If a three-part guide bar is used, the insert parts can simply be placed between the outer plates and upon the middle plate, before the plates are joined together. The insert parts need not be injected or pressed into the guide groove in this case. With such three-part guide bars, the groove bottom is formed by the outer edge of the middle plate.

To attain an additional anchoring of the insert parts in the guide bar, a recess may be provided on the groove bottom or in the edge of the middle plate, and the insert part can be inserted form-fittingly into this recess with its longer longitudinal edge 18, 18a. In this way, the insert part is satisfactorily prevented from tilting about its longitudinal axis or shifting in the longitudinal direction of the guide bar. The recess can preferably be milled out of the groove bottom or out of the edge of the middle plate.

If the insert part is pressed into the guide groove as in the embodiment of FIGS. 4 and 5, then it is pressed into the milled-out recess with the plunger (not shown) that is driven in from above.

It is understood that the foregoing description is that of the preferred embodiments of the invention and that various changes and modifications may be made thereto without departing from the spirit and scope of the invention as defined in the appended claims.

What is claimed is:

1. A guide bar for guiding a saw chain of a motor-driven chain saw as the saw chain is driven, the saw chain including a plurality of cutting links, a plurality of connecting links and a plurality of driving links, the links being pivotally interconnected by rivets or the like and each of the driving links having a raker extending downwardly beyond the connecting links, the rakers having respective lowermost tips, the guide bar comprising:

a flat bar having a peripheral edge;

said bar having two mutually adjacent walls extending along said peripheral edge thereof to conjointly define a groove for receiving the rakers of said driving links therein to guide the saw chain in its movement around the guide bar, the groove having a groove bottom extending between said walls and located at a predetermined distance beneath said tips of said rakers;

lubricating bore means formed in at least one of said walls for conducting lubricating oil to said groove; and, a stationary part mounted on said groove bottom so as to be immovable with respect thereto and defining surface means for directing the lubricating oil to the immediate vicinity of said tips, said surface means including a first surface for accommodating lubricating oil entering through said bore means, said first surface extending approximately parallel to and elevated from said groove bottom so as to reduce said distance and permit said tips to pass through the oil on said first surface thereby directing the same upwardly for lubricating the saw chain; and, a second surface extending to said first surface for feeding the incoming lubricating oil to said first surface.

2. The guide bar of claim 1, said stationary part being an insert part including an elongated base body having an approximately trapezoidal configuration, said base body being disposed in said groove with its longer base seated on said groove bottom.

3. The guide bar of claim 2, the shorter base of said trapezoidal base body being said first surface and being at an elevation above said groove bottom corresponding to approximately the center of said bore means.

4. The guide bar of claim 1, said first surface being at an elevation corresponding approximately to the center of said bore means.

5. The guide bar of claim 4, said first surface having a length extending along said groove which is equal to a multiple of the maximum diameter of said bore means.

6. The guide bar of claim 1, wherein each two successive ones of the driving links of the saw chain guided by the guide bar are spaced from each other by a predetermined driving-link spacing, and wherein said first surface has a length extending along said groove which is equal to said driving-link spacing.

7. The guide bar of claim 2, said elongated base body having a projection extending therefrom and into said bore means so as to engage the latter in a form-tight manner.

8. The guide bar of claim 7, said projection being configured to define said second surface.

9. The guide bar of claim 8, said first surface and said second surface conjointly defining a common plane.

10. The guide bar of claim 3, said stationary part being a molded body made of plastic.

11. The guide bar of claim 1, said bore means including two bores formed in said walls, respectively, so as to lie directly opposite each other, said stationary part being an insert part being mounted in said groove so as to close off one of said bores.

12. The guide bar of claim 11, said insert being held onto said groove bottom and in said bore by means of a press fit.

13. The guide bar of claim 1, said stationary part being an insert part made of pressable material and being a plate-like member, said insert part having a trapezoidal outline when viewed in side elevation and in the unpressed condition, said insert part having a width at the longer trapezoidal base thereof corresponding to the clear width of said groove.

14. The guide bar of claim 13, said insert part being pressed into position on said groove bottom and into said one bore, said insert part including a main portion seated on said groove bottom and having a top step-like surface defining said first surface and an ancillary portion which has a width less than said main portion.

15. The guide bar of claim 14, said ancillary portion extending into said one bore.

16. The guide bar of claim 15, said ancillary portion and said main portion conjointly defining a face in said one bore which faces away from said step-like surface, said face being outwardly convex.

17. The guide bar of claim 16, said main portion having an outer concave surface facing away from said convex face, said outer concave surface being said second surface.

18. The guide bar of claim 17, said second surface extending from the other one of said bores to approximately the mid width of said groove so as to join said first surface.

* * * * *

UNITED STATES PATENT AND TRADEMARK OFFICE

CERTIFICATE OF CORRECTION

PATENT NO. : 4,693,005

DATED : September 15, 1987

INVENTOR(S) : Anton Wehle et al

It is certified that error appears in the above-identified patent and that said Letters Patent is hereby corrected as shown below:

In column 2, line 34: delete "Any" and substitute -- An -- therefor.

In column 3, line 7: delete "from" and substitute -- form -- therefor.

In column 3, line 63: delete "insed" and substitute -- inside -- therefor.

In column 6, line 37: after the word "insert", please add -- part --.

Signed and Sealed this

Fifteenth Day of March, 1988

*Attest:*

DONALD J. QUIGG

*Attesting Officer*

*Commissioner of Patents and Trademarks*